April 10, 1956  L. LONNQVIST  2,741,712
MOTOR
Filed July 6, 1954  2 Sheets-Sheet 2

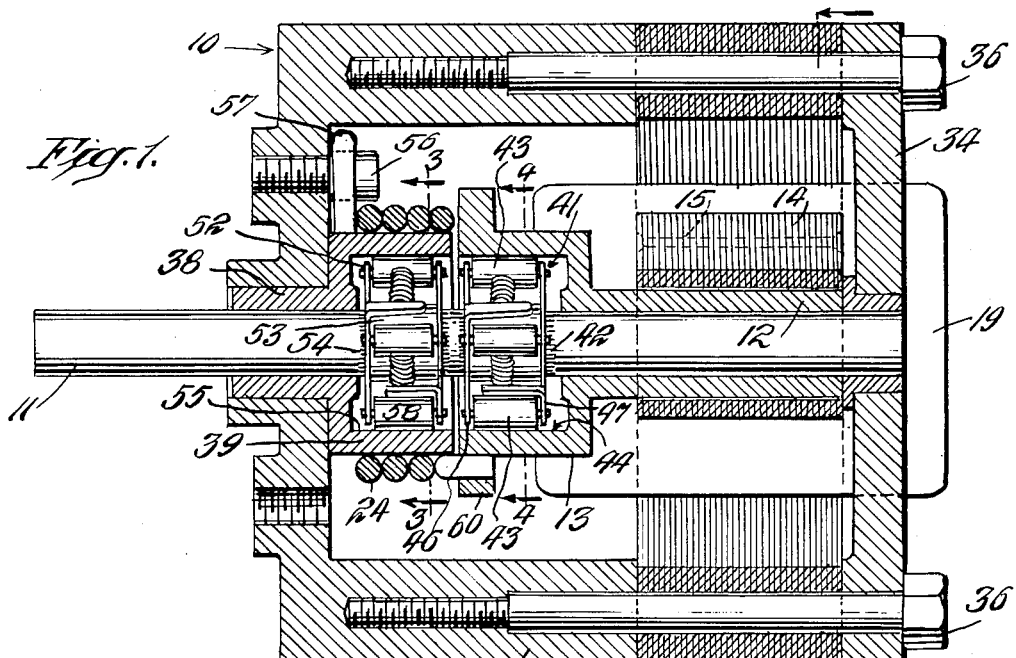

INVENTOR.
LARS LONNQVIST
BY
Frank A. Bower
ATTORNEY

United States Patent Office 2,741,712
Patented Apr. 10, 1956

2,741,712

MOTOR

Lars Lonnqvist, East Orange, N. J., assignor to The Viking Tool & Machine Corporation, Belleville, N. J., a corporation of New Jersey Application July 6, 1954, Serial No. 441,359

4 Claims. (Cl. 310—37)

This invention relates to prime movers and particularly to the rotation of an output shaft by means of incrementally applied impulses.

In the actuation of many pieces of equipment it is desirable to start and stop the equipment instantaneously without delay and to stop the mechanism at a precise setting without over-riding or hunting.

An object of the invention is to provide an electric motor that stops and starts instantaneously at a high torque.

Another object of the invention is to provide an electric motor that is inexpensive to manufacture and is easy to assemble.

Another object of the invention is to provide an electric motor that may operate continuously over long periods of time without overheating.

Another object of the invention is to provide an electric motor in which the prime moving means is a vibratory motion and the vibratory motion is converted to continuous rotary motion.

Further objects and advantages will be apparent from the following description taken in connection with the drawings in which:

Fig. 1 is a side view of the prime mover and

Fig. 2 is a sectional view taken along lines 2—2 of Fig. 1.

Fig. 3 is an end sectional view of the stop clutch taken along lines 3—3 of Fig. 1.

Fig. 4 is an end sectional view of the drive clutch taken along lines 4—4 of Fig. 1.

Figure 6:
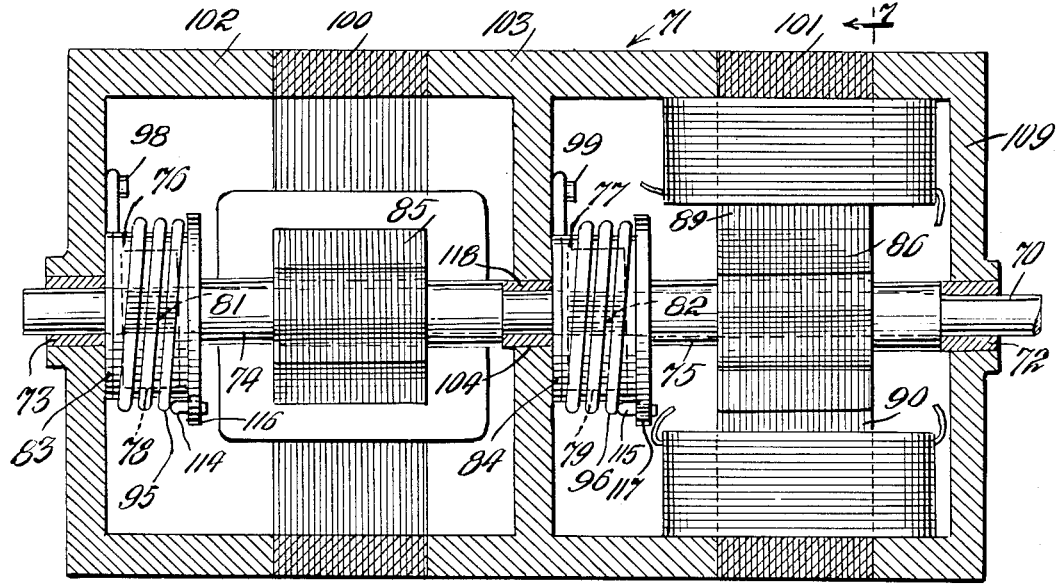
Fig. 6 is a sectional view of a modification of the electric motor and the clutches.

Referring to Fig. 1, the prime mover comprises a frame 10 rotatably supporting a shaft 11. Mounted on the shaft 11 is a sleeve 12 with a cup-shaped housing 13 integral with sleeve 12 and preferably formed from one piece of high carbon steel. The sleeve 12 is rotatably mounted on shaft 11 so that the sleeve may rotate about the shaft with the shaft 11 stationary or moving in the opposite direction. On the sleeve 12 there is an electromagnetically responsive vane 14 of a generally elongated rectangular shape and comprising laminations of ferro-magnetic material such as steel held together by tubular rivets 15. The vane is force-fitted on the knurled sleeve 12 and is positioned between poles 16 and 17 which have electromagnetic coils 18 and 19 respectively wound around the pole pieces forming an electromagnetic flux on passage of current. The poles are integral with the frame 20 which forms flux paths for the field created by the coils 18, 19. Frame 20 and the pole pieces 16, 17 are formed from laminations of ferro-magnetic material held together by rivets 22. The coils 18, 19 are electrically connected to the cable 23 by the leads 23a and 23b. For actuating the prime mover sixty-cycle alternating electric current is continuously supplied to the coils 18, 19 to periodically create a field between the pole pieces. The vane 14 is mounted and held by the shaft 11 to assume a normal non-energized position, as shown in Fig. 2, and rotated to a position shown by dotted lines when the coils are energized. When the fields are energized the vane is rotated rapidly to the position shown in the dotted lines. Further rotation is prevented by the helical spring 24 shown in Fig. 1. On de-energization of the coil the armature is returned to the initial position by the spring 24. The vane is thus returned to a position to be again actuated and rotated and thereby imparting successive rotative impulses to the shaft 11. The coils 18, 19 preferably comprise an enameled copper wire wound around an insulated sleeve 26 and 27 respectively with laminations of insulating material 28 on the outside of each coil to electrically isolate it from the pole piece and frame 20. The coil 18 has similar laminations 29 for the similar reason. The coils may be held on the pole pieces 16, 17 by any conventional means such as brass bars 30, 31 passing through the pole pieces and engaging the insulating laminations 29 thereby holding the coils on the pole pieces and frames.

Secured to the ferro-magnetic frame 20 is the strap 34 and a U-shaped mounting member 35, each preferably comprising cast aluminum. Strap 34, ferro-magnetic frame 20 and mounting member 35 are held together by bolts 36. The strap 34 and the supporting member 35 are made of cast aluminum and the member 35 has a U shape with the legs having tapped holes for receiving the bolts 36 and the connecting member has an opening in the center thereof into which the sleeve 38 is press-fit. Integrally with and preferably formed in one piece with the sleeve 38 is the cup-shaped housing 39. The shaft 11 passes through the sleeve 38 to form a projecting end adapted to carry an output means such as a gear or collar of the driving mechanism (not shown). The mechanism to be driven is connected to the vane 14 through the roller clutch 41 force-fitted on the knurled portion 42 of the shaft 11 and turns with the shaft 11. The roller clutch 41 is enclosed in the housing 13 and has rollers 43 which engage the cylindrical clutch surface 44 which is co-axial with the shaft 11. The roller clutch 41 is a conventional type of clutch and comprises a sleeve 45 having an inner knurled surface and has flanges 46 and 47 at each end of the sleeve. A squeeze cam member is axially centered between the flanges. The rollers 43 are rotatably and slidably mounted in slots 48 and held at one end of a respective cam surface by helical springs 49 engaging an arm 50 connected to one of the flanges. When the housing 13 is rotated the roller 43 is squeezed between the bearing surface and the respective cam surface which causes the clutch and bearing surface to rotate. When the bearing surface is rotated in the opposite direction the rollers slide against the springs and are turned by the bearing surface, permitting the bearing surface to rotate while the shaft 11 remains stationary or is turned in the opposite direction. Thus the vane 14 may be rotated in one direction and actuate the shaft 11 and then rotate in the opposite direction and leave the shaft 11 stationary.

Thus as the vane oscillates between the two places shown in Fig. 2 the shaft 11 is rotated in one direction and remains stationary on the opposite rotation. To assist in the return stroke of the vane a braking or gripping means is applied to the shaft 11 to hold it in position while the vane is returning to the proper position. The holding or braking means is applied through the clutch 52 which is similar or identical in construction to the clutch 41 and comprises similarly a sleeve 53 forced onto the knurled surface 54 to firmly grip the shaft so that it does not rotate in relation thereto. The clutch 52 is housed in the housing 39 and engages a bearing surface 55 to firmly prevent the shaft 11 from being rotated in a direction opposite to that of the actuating stroke of the vane 14 and permitting the rollers 58 to roll on the respective cam surface of the cam 59 when turned in the other direction. The clutches 41 and 52 are reversed in their actuating positions so that when the shaft 11 is turned by the clutch 41 the grip of the clutch 52 is released from the bearing surface 55 to permit an easy rotation of the shaft 11 and when the vane rotates in the opposite direction the grip between the clutch 41 disengages from the bearing surface 44. The clutches 41 and 52 are mounted in the same way on the respective knurled portions. The reversal in actuation takes place by having the clutch 41 turned by the housing 13 and by having the clutch 52 turned by the shaft 11.

The spring 24 may be helical in form fitted outside of the fixed housing 39 and seated on the transverse member of U-shaped piece 35. A projection 56 is cast on the U-shaped piece and forms a post to receive the eyelet 57 anchoring the spring to a fixed or stationary member against which the spring may be compressed. At the other end of the spring is a stiff finger or arm 50 projecting parallel to the shaft and fitting into a hole in the flange 60 of the movable or rotatable clutch housing. The spring is compressed by the clutch housing when the vane 14 is actuated. The conventional sixty-cycle current usually available is substantially of a sinusoidal shape. The electromagnetic flux created between the pole pieces is correspondingly of a sinusoidal shape. The flux passes from zero to a peak value and declines to zero. The vane is actuated during an intermediate portion of this cycle with a return or a recovery period following. During actuation the vane oscillates between an initial position and a final position. The vane is returned to the initial position during this return period. The vane is returned by the uncoiling of the spring 24. The amplitude of the swing of the vane between the initial position and final position is determined by the constants of spring 24 and the density of the electromagnetic flux between the poles 16, 17. The vane is stopped at its final position by the force of the spring equaling the force of the flux. The clutch is then forced in the reverse direction to return it to the initial position. By varying the constants, the spring and the value of the current the amplitude may be varied.

As best shown in Fig. 2 the vane is set at an angle A to the medial line (shown in long dashes) of the pole pieces and is pivoted to an angle B in its final position. In the final position it is preferable that the vane is just inside the pole forces but preferably does not coincide with the medial line. The initial position is preferably outside of the pole faces. The arc C through which the vane moves has the highest flux intensity therefore the force to turn the vane is high. The vane is shown pivoting around the shaft 11 but it may be pivoted independently of the output shaft rather than co-axially as shown.

Figures 5, 7:
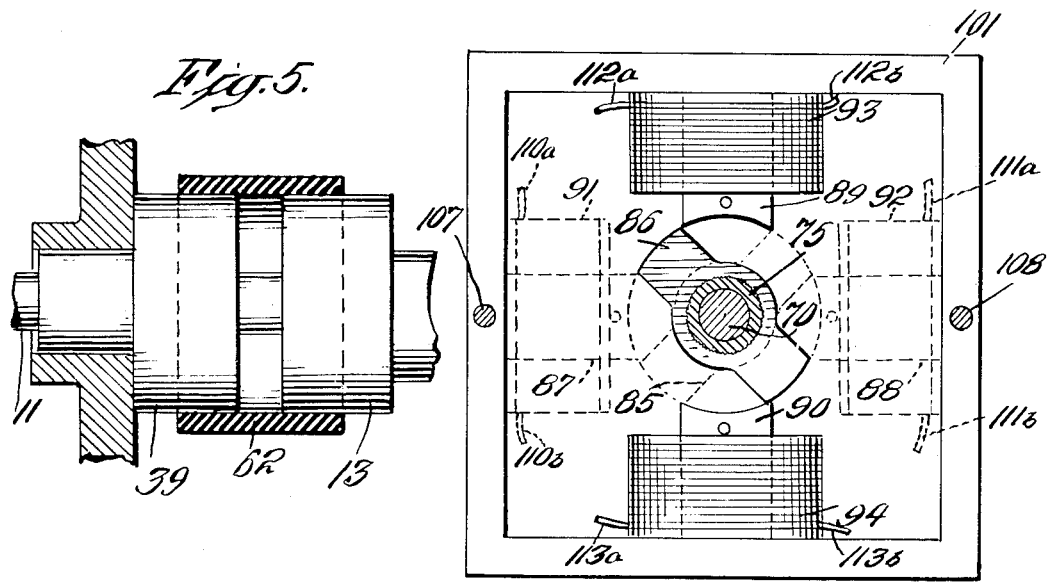
Fig. 5 is a fragmentary sectional view of a modification of the drive and stop clutches.
Fig. 7 is a sectional end view taken along lines 7—7 of Fig. 6.

A modification of the resilient means to return the vane is shown in Fig. 5 wherein the clutch housings 39 and 13 have a cylindrical rubber collar 62 interconnecting them. The collar is securely and rigidly fastened to the outer surface of the clutches and comprises a resilient rubber that will return the clutch, sleeve and vane. The clutch housings are spaced end-wise. The collar circumferentially covers this space and seals the roller clutches from foreign matter. The collar twists on the actuating swing of the vane and restores the vane to the initial position in a manner similar to the spring 24.

In Figs. 6 and 7 a modification is shown for providing a smoother rotation of the output shaft. The shaft 70 is supported at each end in the frame 71 by bushings 72, 73. Sleeves 74, 75 are rotatably mounted on the shaft and have clutch housing 76, 77 rigidly secured to the respective sleeves for engaging the roller clutches 78, 79 housed therein. The clutches actuate in one direction and both are mounted to turn the shaft in the same direction. The clutches are securely fastened to the shaft 70 by the knurled portions 81, 82. The ends of the housing 76, 77 may be closed by discs 83, 84 to seal the clutch chambers. Electromagnetically responsive vanes 85, 86 are force-fitted onto knurled portions of the steel sleeves 74, 75 between the pole pieces 87, 88 and 89, 90 respectively. The pole pieces 87, 88 may be at an angle to the pole pieces 89, 90 or may be aligned. In Fig. 7 the angle is ninety for simplicity of description and representation. Coils 91, 92, 93, 94 are wound around the pole pieces 87, 88, 89, 90 respectively to create separate magnetic fluxes between poles 87, 88 and poles 89, 90. The variation of intensity of the flux between the first pair of pole pieces 87, 88 is out of phase with the flux of the second pole pieces 89, 90. When the vane 85 is actuated by the flux between the associated poles the vane 86 is not actuating the shaft and when vane 86 is actuating the vane 85 is not actuating. Between actuating periods of the vane 85 it is returned to its initial position and between actuating periods of vane 86 the vane 86 is returned to the initial position. Thus vane 85 and vane 86 alternately actuate the shaft 70 through the respective clutches and sleeves. Since the vanes 85 and 86 alternately actuate the shaft the torque of the vane which is not actuating and is returning to the initial position is not sufficient to overcome the actuating torque. In Fig. 7 the vanes 85, 86 are also at an angle to one another but may be aligned with proper phasing and positioning of the pole pieces. The vane 85 pivots through an arc from an initial position to a final position. In the initial position the face of the vane is preferably clear of the corresponding pole face and in the final position the face of the pole overlaps a substantial portion of the corresponding pole piece. When in this latter position the periodic flux is declining and the flux between the other pair of pole pieces is increasing and the face on the vane is sufficient to actuate the vane and continue the rotation of the shaft.

Helical springs 95, 96 are anchored to the frame 71 by means of pins 98, 99 cast in the aluminum to which the springs are anchored at one end to rigidly mount one end to the frame 71 and having a finger at the other end to fit into the hole or recess in the housing 76. During the non-actuating period the vane returns to the initial position ready to receive another impulse.

The frame 71 comprises two ring shaped magnetic members 100, 101 spaced by a T-shaped non-magnetic member 103 having an opening 104 through which the shaft 70 extends. A second non-magnetic U-shaped member 102 is contiguous to the magnetic member 100 cooperating with bolts 107, 108 passing through the members 100, 101, 103 and a strap 109 to clamp and hold the members together as a frame.

The current through coils 91, 92 must either lead or lag the current through coils 93, 94 if a single phase source of electricity is utilized. The coils 91, 92 are in parallel and coils 93, 94 are in parallel. The connection of these paired inductances in series will produce a phase shift between them. Preferably there should be a phase difference in the order of ninety degrees. The required phase shift may be attained by resistors or condensers or other suitable means. The coil 91 has leads 110–a and 110–b. Coil 92 has leads 111–a and 111–b, coil 93 has leads 112–a and 112–b and coil 94 has leads 113–a and 113–b. For simplicity of illustration the interconnection of the coils are not shown. Leads 110–a and 111–a are connected together to the power cable and leads 110–b and 111–b are connected to the leads 112–a and 113–a of the coils 93, 94 and the leads 112–b, 113–b are connected together to a power cable (not shown). Thus coils 93, 94 are connected in parallel and the coils 91, 92 are connected in parallel and the parallel combination is connected in series to a power cable. The return springs 95, 96 may operate in a similar manner to the spring 24 of the embodiment shown in Fig. 1. The springs 95, 96 have projections 114 and 115 respectively fitting in holes in the flanges 116 and 117 which are integral with the housings 76, 77. Thus the vanes 85, 86 are resiliently connected to the frames so that the vanes may be returned to their initial positions, as described hereinbefore.

The sleeve 118 fits in the hole 104 in the member 103. The sleeve does not support the shaft 70 but may engage and space the sleeve 74 and the housing 77. The shaft 70 is supported in the bushings 72, 73 at the ends thereof. Although the actuating periods are described as being successive they should preferably overlap to provide a continuous application of return force to the shaft. The resilient means for returning the vane to the initial position may take any form that stores energy through a given amplitude and returns the vane to the initial position rapidly and accurately. In Fig. 2 the angle of the arc of vibration is preferably in the order of 5 to 10 degrees.

Although the description of this embodiment has been made in connection with sixty-cycle, 120-volt current it is obvious that other frequencies, such as 400-cycles may be used and, of course, other voltages. A pulsating D. C. voltage may be used to energize the coils or a continuous D. C. may be used that is interrupted by mechanical means synchronously actuated with the vane.

The invention is not confined to the foregoing typical embodiment but may be implemented in any desired manner employing an oscillating magnetically actuated vane or vanes to drive a rotary driven element through a one-way drive clutch and with the said driven element in turn held against reverse rotation by a one-way check clutch. The return movement of the vane drive may be by a spring or any other actuation such as a reverse magnetic impulse timed to intervene between the driving impulses. The spring return may stop against a fixed check so that the vane drive builds up to a pre-determined torque before initiating the forward swing. And similarly the forward drive may be restricted to a given arc short of exhaustion of the magnetic effort.

Where a magnetic vane return is used instead of a spring this may have free movement in either direction or be stopped at the end of either the forward or return swing or both.

And the function of the spring and vane efforts may be reversed using a spring to drive the drive clutch and employing the vane effort to effect the return. This will very precisely pre-determine and limit the initial drive effort available and the return torque required of the magnet drive for the vane.

In the vane drive shown the vanes may be mounted on a shaft instead of a sleeve and the vane driven shaft may actuate the one-way drive clutch from the center instead of peripherally, using an outer annulus to pass the torque to the one-way check clutch either peripherally or at the center.

Various modifications may be made without departing from the invention as set forth in the appended claims.

I claim:

1. A prime mover comprising a stationary member, an output shaft rotatably mounted in said member, a sleeve rotatably mounted on said shaft, a first and second one-way actuating roller clutch rigidly fixed to said shaft to actuate in opposite directions, an electromagnetically responsive vane rigidly mounted on said sleeve, first and second clutch surfaces, said first clutch surface rigidly mounted on said sleeve to form a rigid member with said vane, said first clutch positioned around said first roller clutch and gripping said first one-way actuated roller clutch on rotation of the rigid member in one direction and releasing said roller clutch on rotation of the vane in the opposite direction; said second clutch surface positioned around said second roller clutch and rigidly secured to said stationary member and gripping said second roller clutch when said first clutch surface and said first roller clutch are in rolling engagement to hold the shaft stationary and in rolling engagement when said first clutch and said first roller clutch are in gripping engagement.

2. A prime mover as set forth in claim 1 wherein a helical spring is formed around said second clutch surface and rigidly secured to said stationary member at one end and pivotally connected to said first clutch surface at the other end to return said vane to initial position.

3. A prime mover as claimed in claim 1, wherein the clutch housings are adjacent to one another and separated by a space, and said spring means is a resilient rubber member securely fastened to said housings to fix the resilient member at one end and resiliently flex with said vane clutch housing to return said vane to its initial position.

4. A prime mover comprising a shaft, a sleeve having a clutch housing integral therewith and rotatably mounted on said shaft, a roller clutch having a one-way driving action fixed to said shaft and housed in said clutch housing to engage the clutch surface, two electromagnetic pole pieces having coils for passing electric current to produce an electromagnetic flux between said pole pieces, an electromagnetically responsive vane mounted on said rotatable sleeve and positioned between said poles and having an initial position at an angle to the medial line through said pole pieces, spring means engaging said clutch housing to limit the arc of movement of said vane and return said vane to the initial position; a second sleeve having a clutch housing integral therewith and rotatably mounted on said shaft, a second roller clutch having a one-way driving action fixed on said shaft and housed in said second clutch housing to engage the clutch surface, two second electromagnetic pole pieces having coils for passing electric current to produce a flux therebetween, a second electromagnetically responsive vane mounted on said second sleeve and positioned between said second pole pieces at an initial position at an angle to the medial line through said pole pieces, spring means engaging said clutch housing to limit the arc of movement of said second vane and return said second vane to the initial position, said coils of said second pole pieces connected to pass alternating current out of phase to the current through said coils of said first pole pieces so that during the return period of one vane the other vane rotates said shaft.

References Cited in the file of this patent

UNITED STATES PATENTS

| 1,733,872 | Graseby | Oct. 29, 1929 |
| 1,851,543 | Bossard | Mar. 29, 1932 |
| 2,096,458 | Johnson | Oct. 19, 1937 |

FOREIGN PATENTS

| 572,979 | France | Mar. 1, 1924 |